(12) United States Patent
Panek

(10) Patent No.: US 9,618,662 B1
(45) Date of Patent: Apr. 11, 2017

(54) FORWARD VIEWING DEVICE FOR A BICYCLE

(71) Applicant: Carl Francis Panek, Naples, FL (US)

(72) Inventor: Carl Francis Panek, Naples, FL (US)

( * ) Notice: Subject to any disclaimer, the term of this patent is extended or adjusted under 35 U.S.C. 154(b) by 0 days.

(21) Appl. No.: 15/146,351

(22) Filed: May 4, 2016

(51) Int. Cl.
*G02B 7/18* (2006.01)
*G02B 5/04* (2006.01)

(52) U.S. Cl.
CPC .................................. *G02B 5/045* (2013.01)

(58) Field of Classification Search
CPC .. G02B 7/18; G02B 5/045; G02B 5/04; B60R 1/10; B62M 3/16
USPC ........ 359/842, 831, 833, 837; 350/302, 287, 350/299, 298, 292, 286, 97, 100, 102, 350/109, 51, 167
See application file for complete search history.

(56) References Cited

U.S. PATENT DOCUMENTS

| 4,375,316 A * | 3/1983 | Le Vantine ............ G02B 17/02 248/480 |
| 8,979,285 B1 * | 3/2015 | Sasaki .................. G02B 7/1824 359/842 |
| 2012/0307060 A1 | 12/2012 | Henderson |

FOREIGN PATENT DOCUMENTS

JP 2003287742 A * 10/2003

OTHER PUBLICATIONS

"View-Speed Cyclops Glasses", View-Speed.com, http://web.archive.org/web/20130713085611/http://www.shop.view-speed.com/View-Speed-Cyclops-Glasses-610098715948.htm, Jul. 13, 2013.

* cited by examiner

*Primary Examiner* — Stephone B Allen
*Assistant Examiner* — Rahman Abdur
(74) *Attorney, Agent, or Firm* — KINTNER IP, LLC; Mary Frances Ludwig

(57) ABSTRACT

A forward viewing device allows a cyclist having a head down position to view a scene forward of a bicycle. The device includes a prism fixed to a support which is connected to the bicycle forward of the cyclist. An image of the scene is transmitted through a forward facing surface of the prism, reflected internally by at least two surfaces of the prism, and transmitted to the cyclist through a prism surface as an image which is not mirrored left to right or turned upside down. In an embodiment, multiple prisms are positioned with adjacent ends, to increase the horizontal field of view. In another embodiment, multiple prisms are offset vertically, to increase the vertical field of view. In another embodiment, the device has a single optical element and does not require alignment.

16 Claims, 4 Drawing Sheets

FORWARD VIEWING DEVICE FOR A BICYCLE

CROSS REFERENCE TO RELATED APPLICATION

None

TECHNICAL FIELD

The present invention pertains generally to optical systems, and more particularly to a bicycle mounted forward viewing device for a cyclist in a head down position.

BACKGROUND OF THE INVENTION

Viewing devices for cyclists are known in the art. Commonly, these devices use one or more reflecting surfaces to provide a cyclist with forward or peripheral views which are unavailable without a change in riding position. U.S. Pat. Nos. 4,375,316 and 5,148,327 describe such viewing devices. These devices require adjustment to provide the desired view to the cyclist, and are prone to misalignment of the individual optical components.

Another type of viewing device is intended to be worn by a cyclist as a goggle, such as those described in U.S. Pat. No. 4,679,916 and US Pat. App. No. 2012/0307060. These devices significantly restrict the cyclist's field of vision and therefore pose a safety hazard.

A need remains for a device to provide a view of the road ahead to a cyclist in an aerodynamic posture, and which does not require adjustment, is not subject to misalignment, and does not obstruct the cyclist's field of vision in an unsafe manner.

BRIEF SUMMARY OF THE INVENTION

The present invention is directed to a forward viewing device for a bicycle which allows a cyclist to safely follow the road and avoid obstacles while their head is lowered, such as when in an aerodynamic riding position. This device also helps prevent fatigue of neck muscles by allowing a cyclist in an upright position to assume a more relaxed head position. The device is connected to the bicycle and does not require alignment of individual optical components.

In accordance with an embodiment of the forward viewing device, a prism is fixed to a support which is connected to the bicycle forward of the cyclist. An image of a scene in front of the bicycle is transmitted through a first surface of the prism, internally reflected by at least two of the prism surfaces, and transmitted to the cyclist as a normal image.

In accordance with another embodiment, a surface of the prism has a reflective coating.

In accordance with another embodiment, the prism is a Littrow prism.

In accordance with another embodiment, a plurality of prisms are positioned with adjacent ends, to increase the horizontal field of view of the device.

In accordance with another embodiment, a plurality of prisms are offset vertically, to increase the vertical field of view of the device.

In accordance with another embodiment, the device has only a single optical element.

In accordance with another embodiment, the support positions the prism forward of the bicycle head tube and is adjustable to vary the distance between the prism and the head tube. In an embodiment, the prism is positioned between about 8 inches and about 12 inches forward of the head tube. In another embodiment, the support is directly connected to the bicycle handlebars.

Other embodiments, in addition to the embodiments enumerated above, will become apparent from the following detailed description, taken in conjunction with the accompanying drawings, which illustrate, by way of example, the principles of the device and method of use.

LIST OF DRAWING REFERENCE NUMERALS

Figure 1:
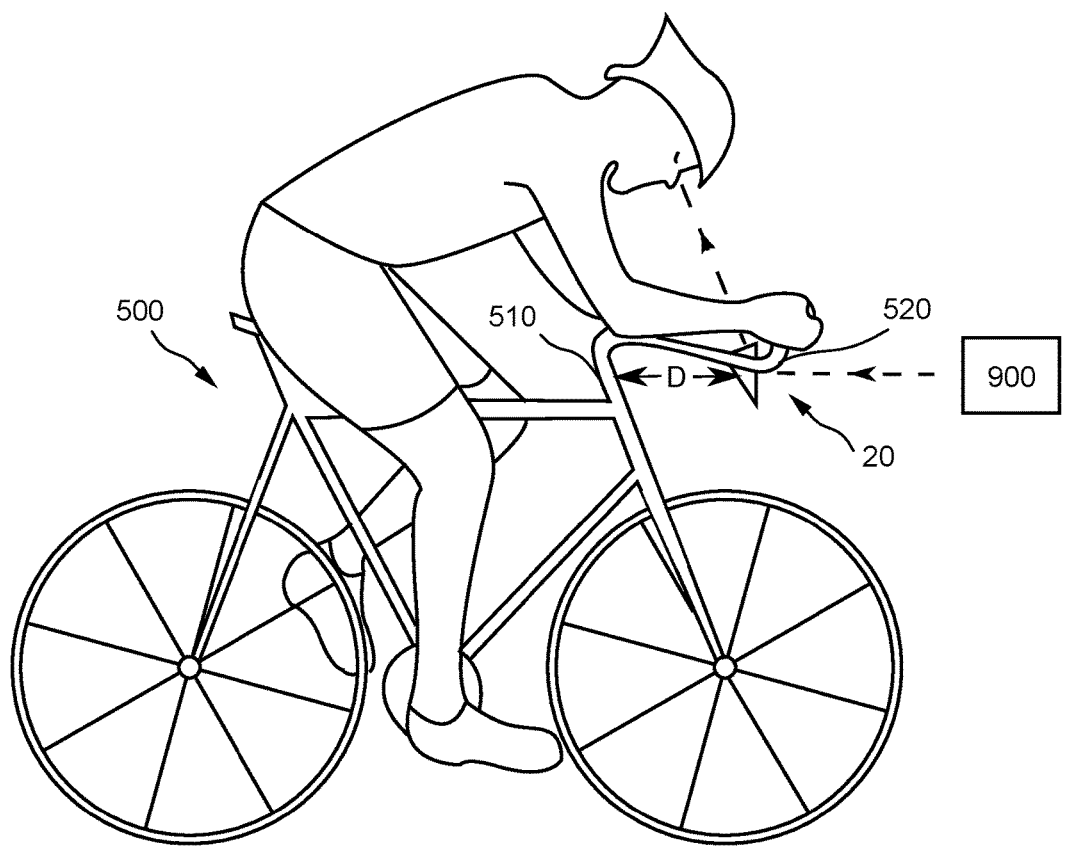
FIG. 1 is a side elevation view of a bicycle having a forward viewing device.

20 device
30 prism
32 first surface
34 second surface
36 third surface
38 end
40 support
500 bicycle
510 head tube
520 handlebars
900 scene
910 image

DETAILED DESCRIPTION OF THE INVENTION

Referring initially to FIG. 1, there is illustrated a side elevation view of a bicycle 500 and a forward viewing device generally designated as 20. Device 20 transmits an image of a scene 900 in front of the bicycle to a cyclist in a head down position. Scene 900 is shown schematically. Head down position refers to any position where the cyclist is not looking forward at the scene in front of the bicycle, and includes an aerodynamic riding position, as shown, as well as various upright or partially upright postures where the cyclist's head is lowered.

Figure 2:
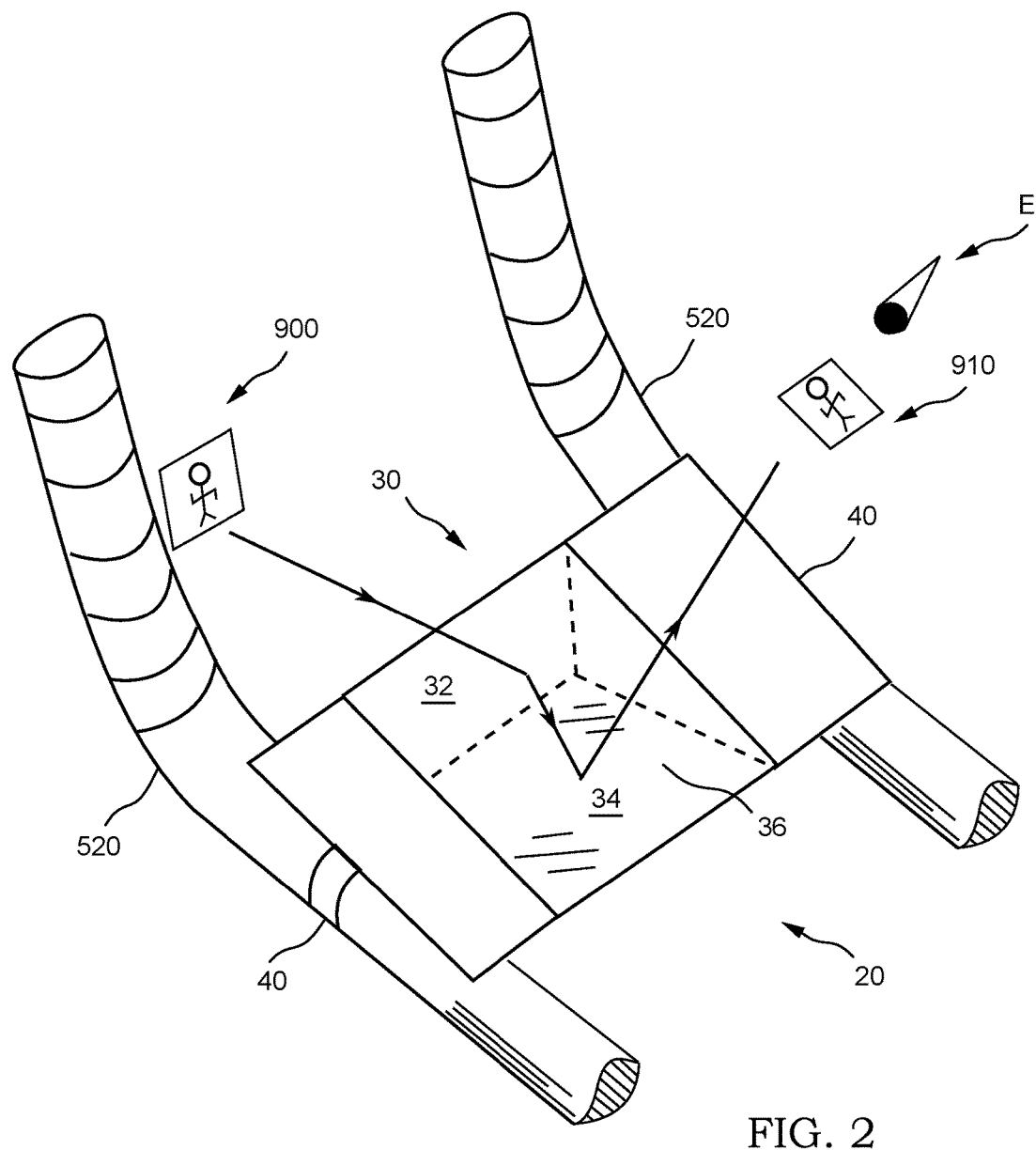
FIG. 2 is a perspective view of the forward viewing device.

FIG. 2 is a perspective view of forward viewing device 20 connected to the aerobars 520 of a bicycle (partially shown for clarity). Elements described herein as connected or coupled have an effectual relationship realizable by a direct connection or indirectly with one or more other intervening elements. Forward viewing device 20 includes a prism 30 and one or more supports 40 to which prism 30 is fixed. Support 40 is connected to bicycle 500 at a location forward of the cyclist, where forward indicates the general direction of travel. Support 40 may be connected to the handlebars (such as aerobars 520, shown) or to a point on the bicycle frame.

Prism 30 has a first surface 32 facing forward in a substantially vertical orientation, a second surface 34, and a third surface 36 in the line of sight of the cyclist, indicated schematically by an eye, E, in the figures. First surface 32 has a first surface area and third surface 36 has a third surface area. The surface which has the larger of the first surface area and the third surface area is the internal reflection surface. An image of the scene 900 is substantially normally incident upon and transmitted through first surface 32, reflected internally to the prism by second surface 32 and the internal reflection surface, and transmitted to the cyclist through third surface 36 as a normal image 910. Normal image means an image that has not been mirrored left to right or turned upside down.

In an embodiment, prism 30 is a Littrow prism, wherein second surface 34 has a reflective coating so as to provide an internally reflective surface. In the embodiment shown, surfaces 32, 34, and 36 of prism 30 form internal angles of 30°, 60°, and 90°. In this case second surface 34 is opposite the 60° angle. The internal angles given are exemplary, and the same result may be achieved with prism 30 having different internal angles.

Prism 30 is preferably oriented so that the image of scene 900 is normally incident on first surface 32, thus eliminating chromatic dispersion due to refraction. In the embodiment of FIG. 2, the image is reflected internally by third surface 36 because the angle of incidence to this surface, in this case 60°, is steeper than the critical angle, above which total internal reflection occurs. The critical angle is determined by the ratio of the refractive indices of the two materials at a boundary, for example the material of prism 30 and of the surrounding air. For prisms made of optical glasses or plastics, the critical angle is approximately 40°. The image is then reflected internally by second surface 34, due to its reflective coating. Normal image 910 is then transmitted through third surface 36, having been diverted by an angle of 60° from scene 900.

Prism 30 is fixed to support 40 in a manner such that its position is not adjustable, such as by gluing or other means well known in the art. In the shown embodiment, support 40 includes a strap on either end for direct connection to the aerobars (one of which is hidden in the figures). The straps allow device 20 to be positioned at a variable distance D forward of the bicycle head tube 510 (see FIG. 1). The position D is variable so that the cyclist may locate device 20 in a position comfortable for their favored riding position. Other types of adjustable support may be used, such as a bracket connected to head tube 510 and having a variable length. In an embodiment, support 40 positions prism 30 between about 8 inches and about 12 inches forward of the head tube. In all embodiments, prism 30 is positioned forward of cyclist's head such that image 910 is transmitted in the cyclist's line of sight.

Figure 3:
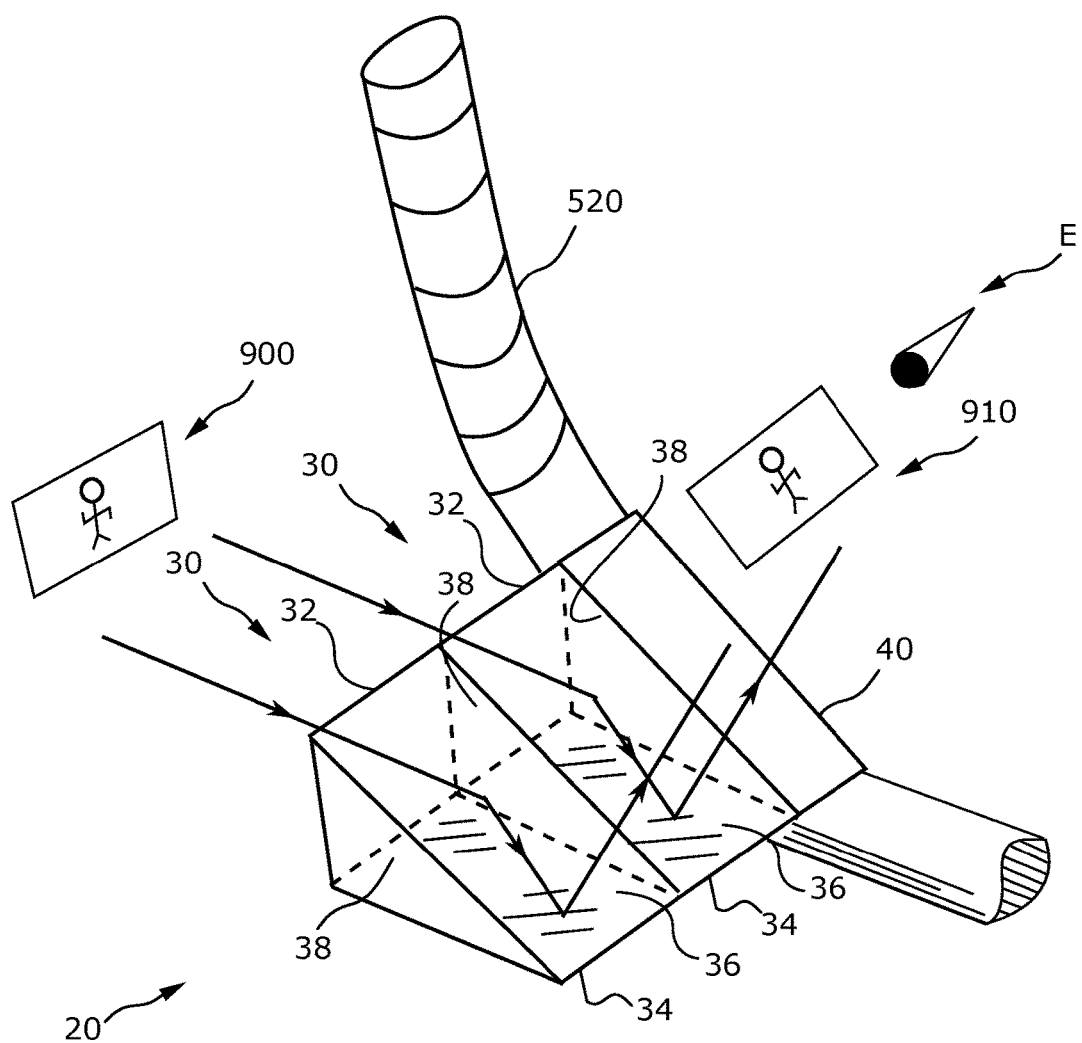
FIG. 3 is a partial perspective view of a second embodiment of the forward viewing device.

FIG. 3 is a partial perspective view of a second embodiment of forward viewing device 20, in which portions of support 40 and bicycle handlebars 520 are not shown. In the shown embodiment, device 20 includes a plurality of prisms 30 (two shown) each having an end 38. Prisms 30 are positioned with ends 38 adjacent in a manner such that their relative alignment is not adjustable. For example, ends 38 may be joined by optical contact bonding. This arrangement of multiple prism 30 increases the horizontal field of view when smaller prisms 30 are used. The image of the scene 900 is transmitted through multiple first surfaces 32, reflected internally to prisms 30, and transmitted to the cyclist through third surfaces 36 as a normal image 910 with wide horizontal field of view.

Figure 4:
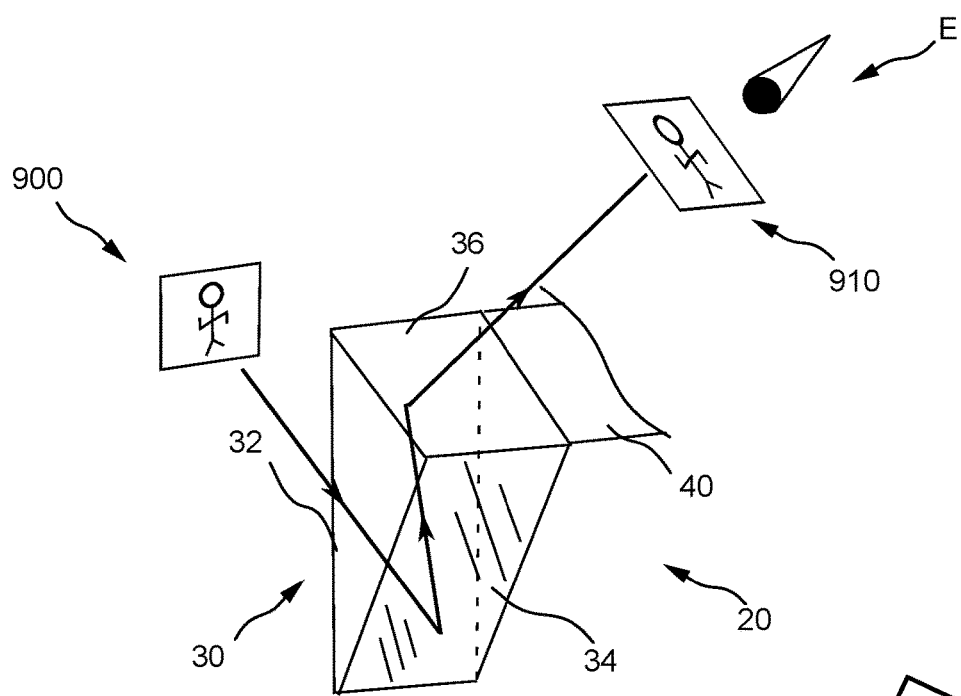
FIG. 4 is a partial perspective view of a third embodiment of the forward viewing device.

FIG. 4 is a partial perspective view of a third embodiment of forward viewing device 20, in which portions of support 40 are not shown for clarity. In this embodiment, first surface 32 is opposite the 90° internal angle of prism 30. Prism 30 is positioned such that the image of scene 900 is normally incident on first surface 32. The image is internally reflected off of second surface 34 and first surface 32, and transmitted through third surface 36 in the cyclist's line of sight. In this arrangement substantially all of third surface 36 is used to transmit image 910, as opposed to the arrangement of FIG. 2 where only the lower half of third surface 36 is used to transmit image 910. In the FIG. 2 arrangement, the upper half of third surface 36 may be blocked from the cyclist's view, as this portion of the surface is used for internal reflection.

Figure 5:
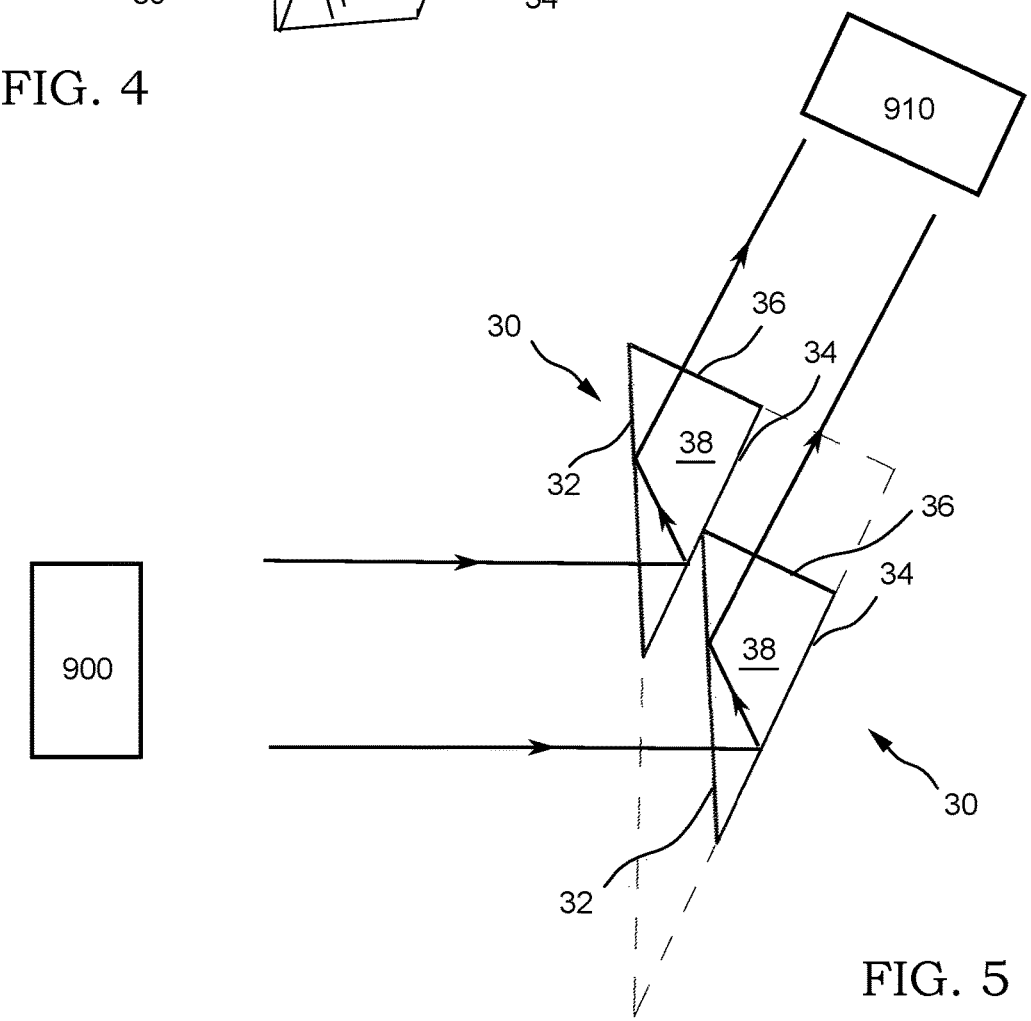
FIG. 5 is a partial side elevation view of a fourth embodiment of the forward viewing device.

FIG. 5 is a partial side elevation view of a fourth embodiment of forward viewing device 20, where support 40 is removed for clarity. In this embodiment, a plurality of prisms 30 are connected to support 40 with a vertical offset. This arrangement is used to increase the vertical field of view. The dashed line indicates the outline of a single large prism with comparable vertical field of view to the two smaller prisms 30 shown. A considerable weight savings is achieved using this arrangement of small prisms 30. Prisms 30 are positioned in a manner such that their relative alignment is not adjustable. For example, prisms 30 are bonded to support 40 at ends 38.

In an embodiment, device 20 includes only a single optical element (as shown in FIGS. 2 & 4). Optical elements include prisms, mirrors, lenses, and others known in the art. The use of a single optical element eliminates the possibility of individual component misalignment, which would prevent all or a portion of image 910 from being transmitted in the cyclist's line of sight.

Further provided is a system, wherein device 20 is packaged with a cooperating bicycle 500. Bicycle as used herein includes other apparatus where a rider has a heads down position, such as a scooter.

The embodiments of the forward viewing device described herein are exemplary and numerous modifications, combinations, variations, and rearrangements can be readily envisioned to achieve an equivalent result, all of which are intended to be embraced within the scope of the appended claims. Further, nothing in the above-provided discussions of the device should be construed as limiting the invention to a particular embodiment or combination of embodiments. The scope of the invention is defined by the appended claims.

I claim:

1. A forward viewing device for a cyclist having a head down position to view a scene forward of a cooperating bicycle, the device comprising:
  a prism having a first surface facing forward in a substantially vertical orientation, a second surface, and a third surface in the line of sight of the cyclist;
  the prism being a Littrow prism;
  the first surface having a first surface area, the third surface having a third surface area, and either (1) the first surface area being larger than the third surface area and the first surface being the internal reflection surface, or (2) the third surface area being larger than the first surface area and the third surface being the internal reflection surface;
  only the second surface having a reflective coating;
  the prism fixed to a support; and,
  the support connected to the bicycle forward of the cyclist;
  so that an image of the scene is substantially normally incident upon and transmitted through the first surface, reflected by the second surface and the internal reflection surface, is substantially normally incident upon and exits the prism through the third surface, and is transmitted to the cyclist as a normal image.

2. The device according to claim 1, further including:
the prism having an end face adjoining the first surface, the second surface, and the third surface; and,
a plurality of prisms each positioned with the end face oriented toward the end face of another of the prisms, to increase the horizontal field of view.

3. The device according to claim 1, further including:
a plurality of prisms arranged so that the first surfaces are offset vertically, to increase the vertical field of view.

4. The device according to claim 1, having only a single optical element.

5. The device according to claim 1, the bicycle having a head tube, the device further including:
the support positioning the prism forward of the head tube; and,
the support adjustable to vary the distance between the prism and the head tube.

6. The device according to claim 5, further including:
the support positioning the prism between about 8 inches and about 12 inches forward of the head tube.

7. The device according to claim 5, the bicycle having handlebars, the device further including:
the support being directly connected to the handlebars.

8. The device according to claim 1, further including:
the device having only a single optical element;
the support positioning the prism forward of the head tube; and,
the support adjustable to vary the distance between the prism and the head tube.

9. A bicycle for a cyclist having a head down position, the bicycle including:
a forward viewing device having a prism having a first surface facing forward in a substantially vertical orientation, a second surface, and a third surface in the line of sight of the cyclist;
the prism being a Littrow prism;
the first surface having a first surface area, the third surface having a third surface area, and either (1) the first surface area being larger than the third surface area and the first surface being the internal reflection surface, or (2) the third surface area being larger than the first surface area and the third surface being the internal reflection surface;
only the second surface having a reflective coating;
the prism fixed to a support; and,
the support connected to the bicycle forward of the cyclist;
so that an image of the scene is substantially normally incident upon and transmitted through the first surface, reflected by the second surface and the internal reflection surface, is substantially normally incident upon and exits the prism through the third surface, and is transmitted to the cyclist as a normal image.

10. The bicycle according to claim 9, further including:
the prism having an end face adjoining the first surface, the second surface, and the third surface; and,
a plurality of prisms each positioned with the end face oriented toward the end face of another of the prisms, to increase the horizontal field of view.

11. The bicycle according to claim 9, further including:
a plurality of prisms arranged so that the first surfaces are offset vertically, to increase the vertical field of view.

12. The bicycle according to claim 9, wherein the forward viewing device has only a single optical element.

13. The bicycle according to claim 9, further including:
a head tube;
the support positioning the prism forward of the head tube; and,
the support adjustable to vary the distance between the prism and the head tube.

14. The bicycle according to claim 13, further including:
the support positioning the prism between about 8 inches and about 12 inches forward of the head tube.

15. The bicycle according to claim 13, further including:
handlebars being connected to the head tube;
the support being directly connected to the handlebars.

16. The bicycle according to claim 9, further including:
a head tube;
the forward viewing device having only a single optical element;
the support positioning the prism forward of the head tube; and,
the support adjustable to vary the distance between the prism and the head tube.

* * * * *